US009405833B2

(12) United States Patent
Tuttle et al.

(10) Patent No.: US 9,405,833 B2
(45) Date of Patent: *Aug. 2, 2016

(54) METHODS FOR ANALYZING DYNAMIC WEB PAGES

(75) Inventors: Timothy D. Tuttle, San Francisco, CA (US); Adam L. Beguelin, San Carlos, CA (US); Peter F. Kocks, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,968

(22) Filed: Sep. 14, 2012

(65) Prior Publication Data

US 2013/0066848 A1 Mar. 14, 2013

Related U.S. Application Data

(63) Continuation of application No. 12/406,404, filed on Mar. 18, 2009, now Pat. No. 8,954,416, which is a continuation of application No. 11/286,269, filed on Nov. 22, 2005, now Pat. No. 7,584,194.

(60) Provisional application No. 60/630,423, filed on Nov. 22, 2004.

(51) Int. Cl.
G06F 17/30 (2006.01)
(52) U.S. Cl.
CPC ...... *G06F 17/30864* (2013.01); *G06F 17/3089* (2013.01)

(58) Field of Classification Search
CPC .......... G06F 17/3089; G06F 17/30893; G06F 17/30864
See application file for complete search history.

(56) References Cited

U.S. PATENT DOCUMENTS

| 6,282,549 | B1 * | 8/2001 | Hoffert |
| 6,516,337 | B1 * | 2/2003 | Tripp et al. ................ 709/202 |
| 6,665,658 | B1 * | 12/2003 | DaCosta et al. |
| 6,983,282 | B2 | 1/2006 | Stern et al. |
| 7,072,888 | B1 | 7/2006 | Perkins |
| 7,519,902 | B1 * | 4/2009 | Kraft et al. ................ 715/234 |

(Continued)

FOREIGN PATENT DOCUMENTS

| AU | 2005309617 | 7/2009 |
| CA | 2588219 | 11/2005 |

(Continued)

OTHER PUBLICATIONS

Examination from the Indian Patent office as Received in 4436/DELNP/2007 on Jun. 3, 2012.

(Continued)

*Primary Examiner* — Alicia Willoughby
(74) *Attorney, Agent, or Firm* — Keller Jolley Preece

(57) ABSTRACT

A computer-implemented method is provided for searching for files on the Internet. In one embodiment, the method may provide an application crawler that assembles and dynamically instantiates all components of a web page. The instantiated web application may then be analyzed to locate desired components on the web page. This may involve finding and analyzing all clickable items in the application, driving the web application by injecting events, and extracting information from the application and writing it to a file or database.

23 Claims, 10 Drawing Sheets

(56) References Cited

U.S. PATENT DOCUMENTS

| | | |
|---|---|---|
| 7,584,194 B2 | 9/2009 | Tuttle |
| 8,266,134 B1 | 9/2012 | Dean et al. |
| 2001/0018693 A1 | 8/2001 | Jain et al. |
| 2002/0032772 A1 | 3/2002 | Olstad et al. |
| 2002/0052928 A1 | 5/2002 | Stern et al. |
| 2002/0078134 A1* | 6/2002 | Stone et al. ............... 709/202 |
| 2002/0091671 A1 | 7/2002 | Prokoph |
| 2002/0099697 A1 | 7/2002 | Jensen-Grey |
| 2002/0116494 A1 | 8/2002 | Kocol |
| 2002/0120609 A1 | 8/2002 | Lang et al. |
| 2002/0129062 A1* | 9/2002 | Luparello ............... 707/513 |
| 2002/0165955 A1 | 11/2002 | Johnson et al. |
| 2003/0023742 A1 | 1/2003 | Allen et al. |
| 2003/0055831 A1 | 3/2003 | Ryan et al. |
| 2003/0061214 A1 | 3/2003 | Alpha |
| 2003/0120654 A1 | 6/2003 | Edlund et al. |
| 2003/0135490 A1 | 7/2003 | Barrett et al. |
| 2003/0191737 A1* | 10/2003 | Steele et al. ............... 707/1 |
| 2004/0039734 A1 | 2/2004 | Judd et al. |
| 2004/0059809 A1* | 3/2004 | Benedikt et al. ............. 709/224 |
| 2004/0088287 A1 | 5/2004 | Elder et al. |
| 2004/0088649 A1 | 5/2004 | Elder et al. |
| 2004/0133558 A1 | 7/2004 | DeVorzon et al. |
| 2005/0060286 A1 | 3/2005 | Hansen et al. |
| 2005/0071741 A1 | 3/2005 | Acharya et al. |
| 2005/0177568 A1 | 8/2005 | Diamond et al. |
| 2005/0187965 A1 | 8/2005 | Abajian |
| 2006/0059144 A1 | 3/2006 | Canright et al. |
| 2006/0167860 A1* | 7/2006 | Eliashberg et al. ............... 707/3 |
| 2006/0277175 A1* | 12/2006 | Jiang et al. ............... 707/5 |
| 2006/0282409 A1* | 12/2006 | Waldrep ............... 707/3 |
| 2007/0282819 A1* | 12/2007 | Lynn et al. ............... 707/3 |
| 2009/0216758 A1 | 8/2009 | Tuttle |
| 2011/0173178 A1 | 7/2011 | Conboy et al. |
| 2014/0046925 A1 | 2/2014 | Strohm et al. |

FOREIGN PATENT DOCUMENTS

| | | |
|---|---|---|
| JP | 2003-296335 | 10/2003 |
| WO | WO 00/33575 | 6/2000 |
| WO | WO 02/10982 | 2/2002 |
| WO | WO 2006/058075 | 2/2009 |

OTHER PUBLICATIONS

Office Action from the Japanese Patent Office as received in Japanese Patent Application No. 2007-543442 on Mar. 2, 2010.

Huang Y.W. et al: "Web Application Security Assessment by fault injection and behavior monitoring", May 24, 2003, pp. 148-159, Proceedings of the 12th international conference on the World Wide Web.

Alvarez M. et al.: "Client-side deep Web data Extraction", Proceedings of the IEEE International Conference on e-commerce technology for Dynamic E-business Sep. 13-15, 2004.

Smith, J.R. et al.: "Visually Searching the Web for Content" IEEE Multimedia, IEEE Service Center, New York, vol. 4, No. 3, Jul. 1, 1997, pp. 12-20.

Office Action from the Chinese Patent office as received in Chinese Application No. 200580047029.4 on May 25, 2010.

Office Action from the Canadian Patent Office as received in Canadian Patent Application No. 2588219 on Aug. 24, 2012.

Office Action from the Australian patent office as received in Australian patent application No. 2005309617 on Oct. 28, 2008.

International Search Report as received in PCT/US05/042456 on Dec. 2, 2009.

U.S. Appl. No. 11/286,269, filed May 30, 2008, Office Action.
U.S. Appl. No. 11/286,269, filed Dec. 10, 2008, Notice of Allowance.
U.S. Appl. No. 11/286,269, filed Apr. 24, 2009, Notice of Allowance.
U.S. Appl. No. 12/406,404, filed Jul. 18, 2011, Office Action.
U.S. Appl. No. 12/406,404, filed Dec. 29, 2011, Office Action.
U.S. Appl. No. 12/406,404, filed Jul. 30, 2013, Office Action.
U.S. Appl. No. 12/406,404, filed Dec. 4, 2013, Office Action.
U.S. Appl. No. 12/406,404, filed Mar. 12, 2014, Office Action.
U.S. Appl. No. 12/406,404, filed Sep. 23, 2014, Notice of Allowance.

* cited by examiner

METHODS FOR ANALYZING DYNAMIC WEB PAGES

CROSS-REFERENCE TO RELATED APPLICATIONS

The present application is a continuation of U.S. application Ser. No. 12/406,404, filed Mar. 18, 2009, which is a continuation of U.S. application Ser. No. 11/286,269, filed Nov. 22, 2005, which is now issued as U.S. Pat. No. 7,584,194, which claims the benefit of and priority to U.S. provisional application No. 60/630,423, filed Nov. 22, 2004. Each of the aforementioned patent(s) and application(s) are hereby incorporated by reference in their entirety.

BACKGROUND OF THE INVENTION

1. The Field of the Invention

The technical field relates to search engines, and more specifically, to search engines capable of searching for video files and designed to extract detailed information from modern web pages and web applications. The application crawler according to the present invention is significantly different from standard web crawlers in many ways.

2. The Relevant Technology

Standard web crawlers were originally designed for web pages where the bulk of useful information about the page was contained in an HTML text file T. FIG. 1A shows the inadequacies of standard web crawlers today when applied to current web pages. In web pages today, it is increasingly common for the useful information about the page to be contained in a variety of different files, which are all assembled in the browser to create the complete application. Common files that are used in modern web applications include:

- Multiple HTML files and framesets
- Image files such as GIFs or JPEGs
- Javascript, Jscript and VB Script files
- Cascading Style Sheet files
- XML data files
- ActiveX controls or browser plug-ins
- Video and audio streams
- Flash animations
- HTML behaviors
- Embedded media players In today's modern web applications, it is not uncommon for a single web page to rely on all of these technologies to create the page. Given that, web pages today are no longer simply static documents. In many cases they are fully functioning dynamic applications that maintain complex states and execute sophisticated actions in response to user input or other browser or timer events.

There is a need for an application designed specifically to be able to understand and extract useful information from these modern web applications. As such, its capabilities significantly surpass the capabilities of traditional web crawlers, which are typically only capable of understanding static file types such as HTML, PDF, and the like.

SUMMARY OF THE INVENTION

The present invention provides solutions for at least some of the drawbacks discussed above. Specifically, some embodiments of the present invention provide a crawler that does not just parse text in an HTML file and inspect the contents for links indicating the presence of a video file. The present invention provides an improved crawler that can more thoroughly search the Internet for files such as, but not limited to, video files, media files, multimedia streaming services, and/or non-static file types. The present invention also provides an improved crawler that can search the Internet for specific pieces of information such as, but not limited to, text strings, images, nodes of a document object model, and/or other classes of data objects, which are typically contained within a modern web application. The present invention may be designed to extract more detailed information from web pages than current Internet crawlers. At least some of these and other objectives described herein will be met by embodiments of the present invention.

In one aspect, the present invention provides a way to crawl objects in the object space or object model of a document or application, particularly on the Internet. Specifically, the present invention crawls the object model of the World Wide Web (WWW). The crawler of the present invention may dive into the functioning applications or instantiated applications that result when files or pages are executed on the web, not just un-instantiated and/or static documents. This indexing occurs both within an individual web application and across web sites located anywhere on the Internet. This may involve inspecting the object model and doing the inspecting across many machines, networks, or sites. In one embodiment, crawling or indexing of the object space occurs across a distributed collection of applications and/or networks. In the past, there has been no desire to do so since the pages of previous web documents were generally monolithic and static and did not need to be instantiated to fully ascertain the content therein. Applications and documents have become complex enough that it is desirable to crawl the object space to find all available content. Additionally, previously the objects were not easily accessible, and thus crawlers were not designed to crawl the object space.

In one embodiment of the present invention, the crawling of the object space occurs once a document is instantiated. In other words, the present invention crawls a functioning application. This allows the crawler to find additional objects or elements that are loaded once the application or web page is instantiated. Without instantiation, much of the content may not be visible. In terms of content that can be found, there is a difference between a static file that is read and one that has been instantiated in a running application.

In one embodiment of the present invention, an indexer is provided that can reach in and examine any electronic version of a document or application media file and index the content of it. It does so by reaching into any node or element of that application and recording it in a database or having a pointer to it. This method applies to any node or element of the object model (piece or object) of the instantiated application.

More specifically, one embodiment of an application crawler according to the present invention may be configured to load, assemble, and instantiate full web applications. As seen in FIG. 1B, web pages today may be laden with multiple components, such as, but not limited to, scripts and embedded controls, that can run simultaneously. On top of this, there are pages using dynamic HTML for which traditional crawlers were not designed. The present invention may provide a crawler that can load and instantiate all of these components. In that instantiated instance of that application, it looks for software objects that may be indicative of content such as, but not limited to, video content. The crawler will simulate pressing buttons on web pages or clicking on links and store information gathered in this manner to a file or a database.

In yet another embodiment of the present invention, a method is provided for an application crawler. (1) In one aspect, the application crawler may load all the components that create a web document together (not just an HTML document). By way of example and not limitation, this includes multiple HTML documents, multiple scripts, embedded software, style sheets that are loaded in the background, HTML behaviors (separate scripts), XML files, and/or all the various files that are loaded for a web page. (2) In another aspect, the application crawler may be designed so that the components of a web page are assembled as one and instantiated so that it is viewed as an application as opposed to a text document. (3) In a still further aspect, the application crawler may take that object representation and then pull out specific pieces of metadata that are related to a file such as, but not limited to, a video file or related to the information being displayed to the user. That is, the metadata available in the object space may not be related to a "file" but to whatever information is being displayed. There is also the timeline to consider. The relevant metadata may be related to the information that happens to be currently displayed, either as the result of a predetermined timeline that the web application determines (as is common in Flash movies) or as a result of specific user action (for example a pop-up window appearing as a result of a user click). In one embodiment, the present application can reach into a video stream or video player and pull out relevant data. The invention can look at events that are fired by the video stream and obtain information in that manner.

In another embodiment of the present invention, an RSS feed may be used to provide a target URL to the crawler for inspection. In this embodiment, the crawler may examine the full object space and object model of the instantiated web application corresponding to the provided URL. The crawler may extract the metadata from the media player or elsewhere in the web application. Thus, in this embodiment, crawling is via RSS pointer to pages. The crawler is directed by the RSS feed which provides a URL with an HTTP link. Thus crawling may include: (1) crawling a tree of clickable items and activating them in the way a user would (but in an automated way in a manner identical or similar to the way a human would) and/or (2) crawling via a seed list of pages or applications (such as a list of URLs or a list of application pointers, or a list from an RSS feed).

In another embodiment of the present invention, the application crawler may use any one of three templates: (1) one for the site itself (timing, commercials, etc. where to start crawl), (2) a link finder (find links), and/or (3) one for data extraction (location of title, director, author, etc.). For example, crawling and indexing may occur based on temporal events (temporal synchronization of changes that occur at the same time other events occur), spatial relationships (visual spatial relationships), or other triggers. Using the first template, the crawler simulates end-user activity such as clicking on buttons on a web page. Timing events, such as looking at an object after 30 seconds, may also be template controlled and allow the crawler to more thoroughly investigate a web page. The templates may instruct the crawler to wait certain time intervals and then crawl the object tree again. This template that controls timing is particularly useful for mining content in today's complex web pages.

Templates may also be used for extracting specific pieces of information from an instantiated application. The crawler may use templates to identify portions or nodes of an object model, strings of text, single objects or collections of objects in the object space of the application, and/or pages or files contained within the application. As a nonlimiting example, the crawler of the present invention may gather information about the duration of a video, the resolution of the video, the title of the video, the description of the video, the quality of the video, the origin of the video, and/or other related information. The collected metadata is saved into a database. It should be understood that in one embodiment, the template may be a set of instructions and/or programming code that instructs the crawler on how to crawl and/or index a web page, application, or the like.

The present invention may also include an application crawler to crawl a media player object and/or the ability to traverse an object tree using a very simple application crawler. The crawler may know that there will be a video playing. This simplified crawler may verify a URL to ensure data integrity and also locate video files. This simplified crawler may be useful on some pages that have so much dynamic content (e.g. ads, etc.) that it may be burdensome to load all files.

In one embodiment of the present invention, a computer-implemented method is provided that comprises crawling and indexing an object model of multiple running, instantiated documents or applications. The method may include crawling that comprises of going from machine to machine to traverse at least one document or application on each machine. The machines may be located in different physical locations and are coupled to a computer network. Crawling may also include following a tree of clickable items and activating items in an automated manner substantially similar to the manner a human user would.

The method may involve following a seed list of pages or applications. The method may involve following a seed list of pages or applications selected from at least one of the following: a list of URLs, a list of application pointers, or an RSS feed. The method may involve traversing the object tree in the object model of the instantiated documents or applications. The method may involve traversing the object tree in the object model of the instantiated documents or applications and recording the objects' location and contents. The method may involve loading the documents or applications; instantiating the documents or applications; and traversing the object tree in the object model of the instantiated documents or applications. The method, may involve reaching into any node in the object model of the running, instantiated documents or application and recording the node in a database. In another embodiment, the method may involve reaching into any node in the object model of the running, instantiated documents or application and saving a pointer to the node in a database. In yet another embodiment, the method may include saving a plurality of uniform resource locators (URLs) associated with media into a database.

The method may involve traversing the object tree in the object model of the instantiated documents or applications and simulating mouse, keyboard, or other user events. The method may involve waiting a defined period of time after the mouse event, keyboard event, other user event, a browser event, or a media player event, and then traversing the object tree. The method may involve waiting a defined period of time after the mouse event, keyboard event, other user event, a browser event, or a media player event, and then traversing an object tree of a new application or document displayed as a result of the event. The object may be any node or element of the object model of the instantiated documents or applications. The documents or applications being crawled may include at least one of the following: a word processing file, an Acrobat file, a spreadsheet, a browser application, a media player, a multimedia application, or a metadata header embedded in a media stream. The documents or applications being crawled may include an operating system. The documents or applications being crawled may include a file system.

The method may involve crawling the following types of networks: intranet, single machine, or multiple apps on a single machine. The method may involve crawling the Internet. The method may involve crawling any device on a TCP/IP network. The method may involve crawling any device on a public network. The method may involve crawling any device on a private network. The method may involve applications or documents that are fully instantiated. In some embodiments of the present invention, only a portion of the applications or documents are instantiated. The method may involve instantiating video files. The method may involve instantiating video streams. The method may involve adding data-query interfaces to software objects in the running instantiated documents or applications to allow for interface with an application crawler. The method may involve lowering security controls to allow access to the object model.

In yet another embodiment of the present invention, a computer-implemented method is provided for searching for video files on a computer network. The method comprises crawling and indexing an object model of multiple running, instantiated documents or applications to locate video files.

In another embodiment of the present invention, a computer-implemented method is provided for creating a searchable database. The method comprises crawling an object model of multiple running, instantiated documents or applications to locate video files; indexing video files found in the object model by saving pointers to the video files in the database; and extracting metadata about the video files from the object model and saving the metadata in the database.

In yet another embodiment of the present invention, a computer-implemented method for searching for files on the Internet comprises providing a protocol crawler for identifying video-rich websites; and providing an application crawler. The application crawler may include an inspector for dynamically instantiating and assembling all components of a web page at one of said video-rich web sites to create at least one instantiated web application. The application crawler may also include an extractor for identifying specific parts of the instantiated web application that contain useful information and providing the logic required to extract that information into a metadata record; and a crawler for analyzing the instantiated web application, finding and analyzing all clickable items in the application, driving the web application by injection events, and extracting information from the application and writing it to a file or database.

In one embodiment, the inspector may include code for software components for at least one of the following: a Document Object Model (DOM) implementation for one or multiple browsers; a scripting engine capable of executing JavaScript, JScript, ECMAScript or VBScript; an XML parsing engine; a Cascading Style Sheet engine; a network I/O library; an HTML parsing and rendering engine; an engine for executing embedded controls such as ActiveX controls; or an engine for rendering web applications.

In one embodiment, the extractor may include code for software components for at least one of the following: an XSL engine; an XPath implementation; a regular expression engine; a script execution engine; an embedded object inspector for components such as, but not limited to, ActiveX and COM objects; a network transport proxy, such as an HTTP proxy; a RTSP or other multimedia stream proxy; a software bridge to process data with class libraries of external programming frameworks; a taxonomy engine for categorizing metadata; or a text parsing and processing engine.

In one embodiment, the crawler may include code for software components for at least one of the following: a file I/O library; a network I/O library; or a library for generating and storing logfiles.

In yet another embodiment of the present invention, a computer-implemented method is provided for searching for files on the Internet. The method comprises finding a target URL; downloading the HTML file for the target URL; downloading supplementary data files used to build the complete web application, based on the information in the HTML file; assembling application components from said supplementary data files and the HTML file; instantiating application components to create a web application; applying data-query interfaces to all objects in the web application that may contain useful data; loading a predefined application template or generating and automatically-defining an application template; applying the application template to extract all of the desired information from the web application; saving the desired information to a file or database as a structured-data information record; examining all components in the web application to identify all possible components that could respond to a mouse event or form a clickable item; determining which clickable items have appeared since the last simulated mouse event; storing new clickable items in an appropriate data structure, such as a new branch of a tree containing all clickable items in the application at all possible application states; and simulating a mouse click on the first clickable item in the current branch of the clickable item tree.

The method may include repeating this method until the entire tree of clickable items has been traversed. The instantiating step includes at least one of the following: rendering HTML and constructing the Document Object Model; applying style sheets; executing scripts in an appropriate script interpreter; activating any controls or plug-ins, such as ActiveX controls; launching video or audio streams; launching animations such as Flash animations; or executing HTML behavior scripts.

In another embodiment of the present invention, the computer system comprises an application crawler having programming code for crawling and indexing an object model of running, instantiated documents or applications from the websites. The system may also include a protocol crawler for identifying websites for inspection wherein the application crawler crawls and indexes the object model of running, instantiated documents or applications from the web sites. The application crawler may include an inspector for dynamically instantiating and assembling all components of a web page at one of the web sites to create at least one instantiated web application. The application crawler may also include an extractor for identifying specific parts of the instantiated web application that contain useful information and providing the logic required to extract that information into a metadata record. Additionally, the application crawler may include a crawler for analyzing the instantiated web application, finding and analyzing all clickable items in the application, driving the web application by injecting events, and extracting information from the application and writing it to a file or database. The protocol crawler identifies web sites for inspection that contain at least one video file, at least one media file, or at least one of the following: an MPE6 file, an AVI file, a Real Media file, a Flash file, a .ts file, a .wmv file, or a Quicktime™ file. The application crawler is configured to inspect a tree of clickable items and activate each item in an automated manner substantially similar to the manner a human user would. The application crawler may use a template configured for at least one of the following: data extraction, timing of when to follow a link, depth to crawl, how to skip a commercial, where to start a crawl, finding links, location of title, location of media file metadata, temporal synchronization, or instructing the crawler to wait certain time intervals and then crawl the object tree again.

In yet another embodiment of the present invention, a computer system is provided that includes a protocol crawler for identifying video-rich web sites and an application crawler. The application crawler includes an inspector for dynamically instantiating and assembling all components of a web page at one of said video-rich web sites to create at least one instantiated web application; an extractor for identifying specific parts of the instantiated web application that contain useful information and providing the logic required to extract that information into a metadata record; and a crawler for analyzing the instantiated web application, finding and analyzing all clickable items in the application, driving the web application by injecting events, and extracting information from the application and writing it to a file or database.

In yet another embodiment of the present invention, a computer-implemented method comprises receiving a target URL and indexing an object model of multiple running, instantiated documents or applications. The receiving step may include receiving a list of URLs. The receiving step may also include receiving at least one of the following: a list of URLs, a list of application pointers, or an RSS feed. The method may include traversing the object tree in the object model of the instantiated documents or applications.

In another embodiment of the present invention, a computer program product comprises of a computer usable medium and computer-readable code embodied on said computer usable medium. The computer-readable code comprises computer-readable program code configured to cause a computer to effect crawling and indexing of an object model of a running, instantiated document or application.

A further understanding of the nature and advantages of the invention will become apparent by reference to the remaining portions of the specification and drawings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF SOME EXAMPLE EMBODIMENTS

It is to be understood that both the foregoing general description and the following detailed description are exemplary and explanatory only and are not restrictive of the invention as claimed. It may be noted that, as used in the specification and the appended claims, the singular forms "a", "an" and "the" include plural referents unless the context clearly dictates otherwise. Thus, for example, reference to "a crawler" may include multiple crawlers, and the like. References cited herein are hereby incorporated by reference in their entirety, except to the extent that they conflict with teachings explicitly set forth in this specification.

As an overview, a program such as a crawler will pre-traverse a computer network in search of documents (e.g., web pages) and build large index files or databases of links, keywords, and/or metadata found in the documents. When a user formulates a query comprising one or more search terms, the user submits the query to another program of the search engine. In response, the search engine inspects its index files and displays a list of documents that match the search query, typically as hyperlinks. The user then typically activates one of the hyperlinks to see the information contained in the document.

Figure 1A:
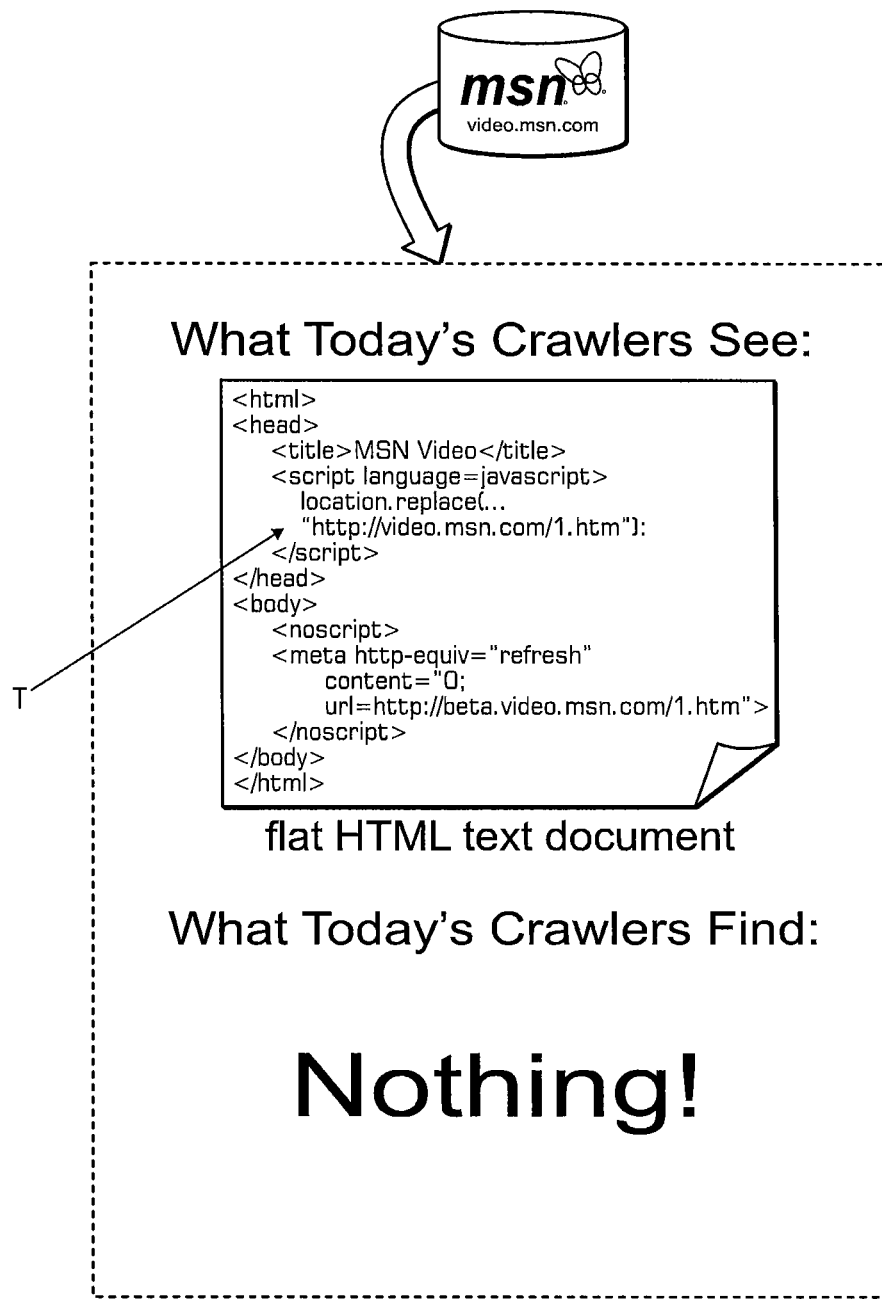
FIG. 1A shows the results found by existing crawlers.
Figure 1B:
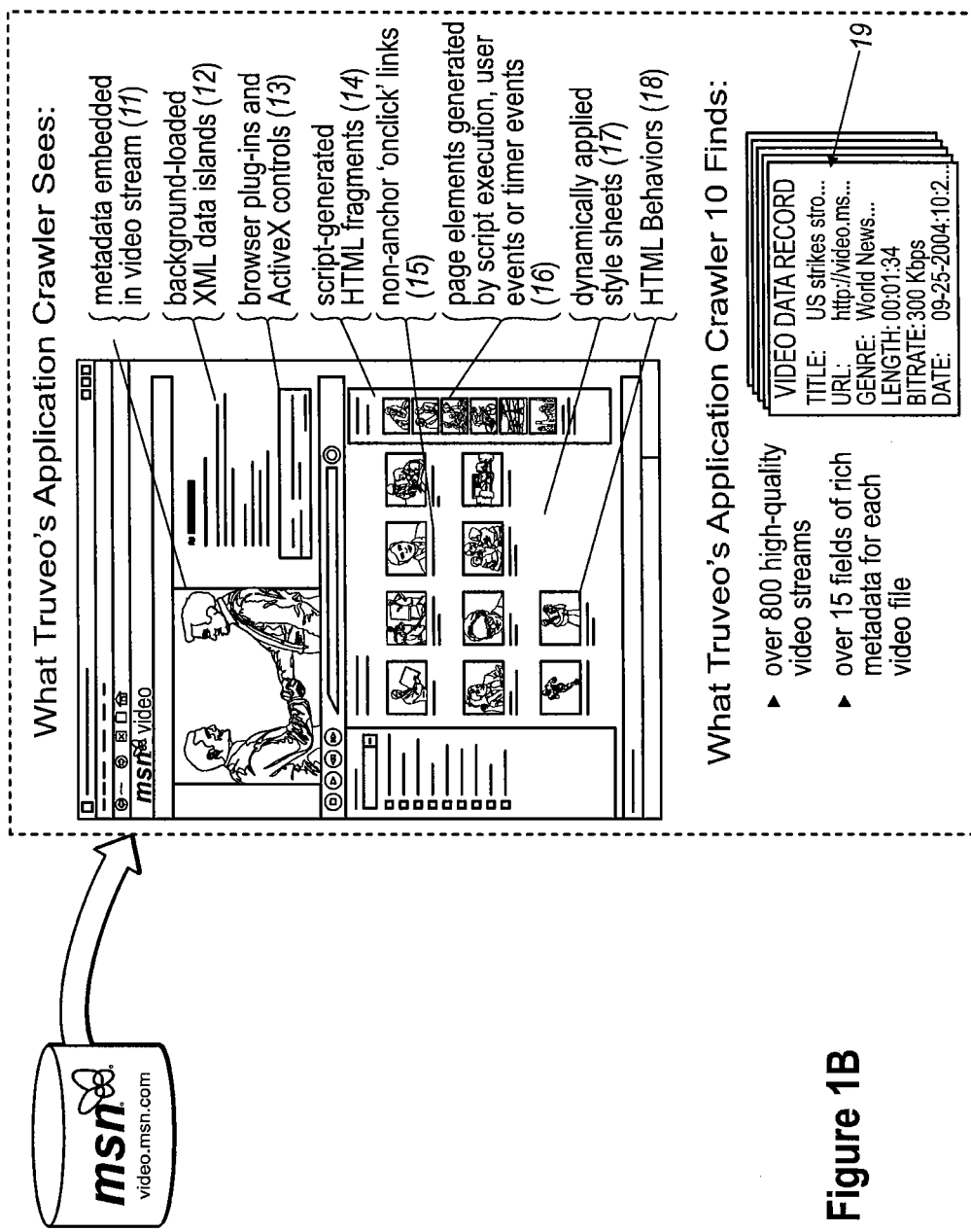
FIG. 1B shows more detailed information found by a crawler according to the present invention.

As seen in FIGS. 1A and 1B, the Truveo Application Crawler 10 is much improved over traditional crawlers for finding files such as, but not limited to, media files. As seen in FIG. 1B, the Crawler 10 may examine and operate complex web applications containing components such as, but not limited to, video streams 11, background-loaded XML data islands 12, browser plug-ins and ActiveX controls 13, script-generated HTML fragments 14, non-anchor 'onClick' links 15, form elements, page elements generated by script execution, user events or timer events 16, dynamically applied style sheets 17, HTML behaviors 18, and the like. The Crawler 10 may examine and operate web applications that consist of single or multiple documents, frames, framesets, files, objects, applications and/or windows. Information about each media file may be saved as a video data record in a database. The video data record 19 may include information such as, but not limited to, title, description, URL, genre, video runtime or length, bit rate, date, and the like.

Figure 2:
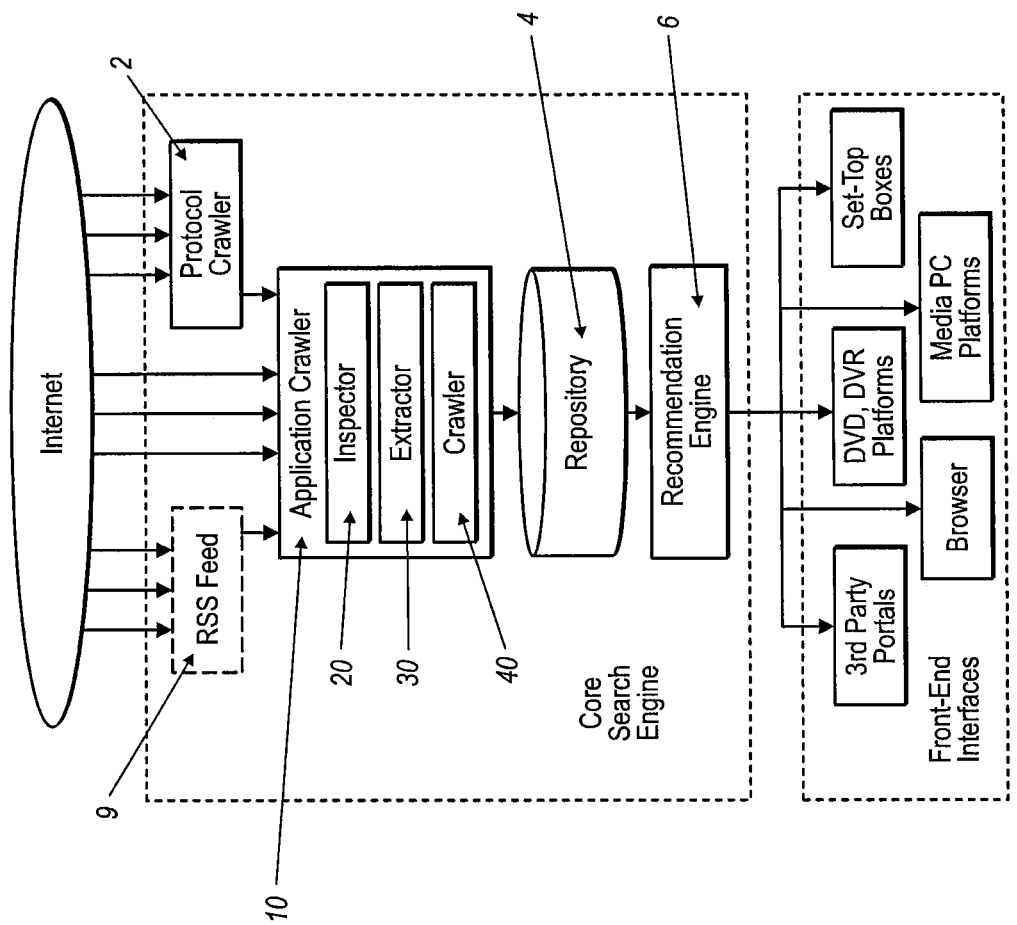
FIG. 2 is a schematic of one embodiment of the present invention.

As an overview, one embodiment of the present invention may include a Protocol Crawler 2, a Repository 4, a Recommendation Engine 6, and an Application Crawler 10 (see FIG. 2). The Protocol Crawler 2 is a high throughput HTTP engine that crawls the web and identifies sites that may host video content. The Protocol Crawler 2 directs the Application Crawler 10 to crawl and index particular sites. Information gathered by the Application Crawler 10 is stored in a Repository 4. Optionally, a Recommendation Engine 6 may be used to aid in providing useful responses to queries issued against the repository.

Design of the Truveo Application Crawler

Referring now to the embodiment shown in FIG. 2, the Truveo Application Crawler 10 may contain three components that work in concert to provide complete functionality. These three components are (1) the Inspector 20, (2) the Extractor 30, and (3) the Crawler 40 and are described as follows. It should be understood, however, that this is one embodiment of the present invention and that other embodiments may combine functionalities of these components in different order or into fewer components. As a nonlimiting example, the Inspector 20 may be combined with the Extractor 30, the Inspector 20 may be combined with the Crawler 40, or the like.

As an overview, the technology of the Application Crawler 10 enables today's composite web applications to be crawled. As a nonlimiting example of Application Crawler 10, the Inspector 20 dynamically instantiates and assembles all components into a complete functioning application. The Extractor 30 may be an adaptive data mining engine that leverages XPath, scripts, XSL and DOM navigation to extract rich metadata. The Crawling Engine 40 identifies dynamic links and generates user events and timer events. It should be understood that with regard to FIG. 2, some embodiments of the present invention may have RSS feeds 9 (shown in phantom) and other XML feeds or even a simple list of web sites as an independent source of input for the Application Crawler 10, instead of the Protocol Crawler 2. Still other embodiments of the Application Crawler 10 are used without a Protocol Crawler or RSS feed as input.

Inspector

Figure 3:
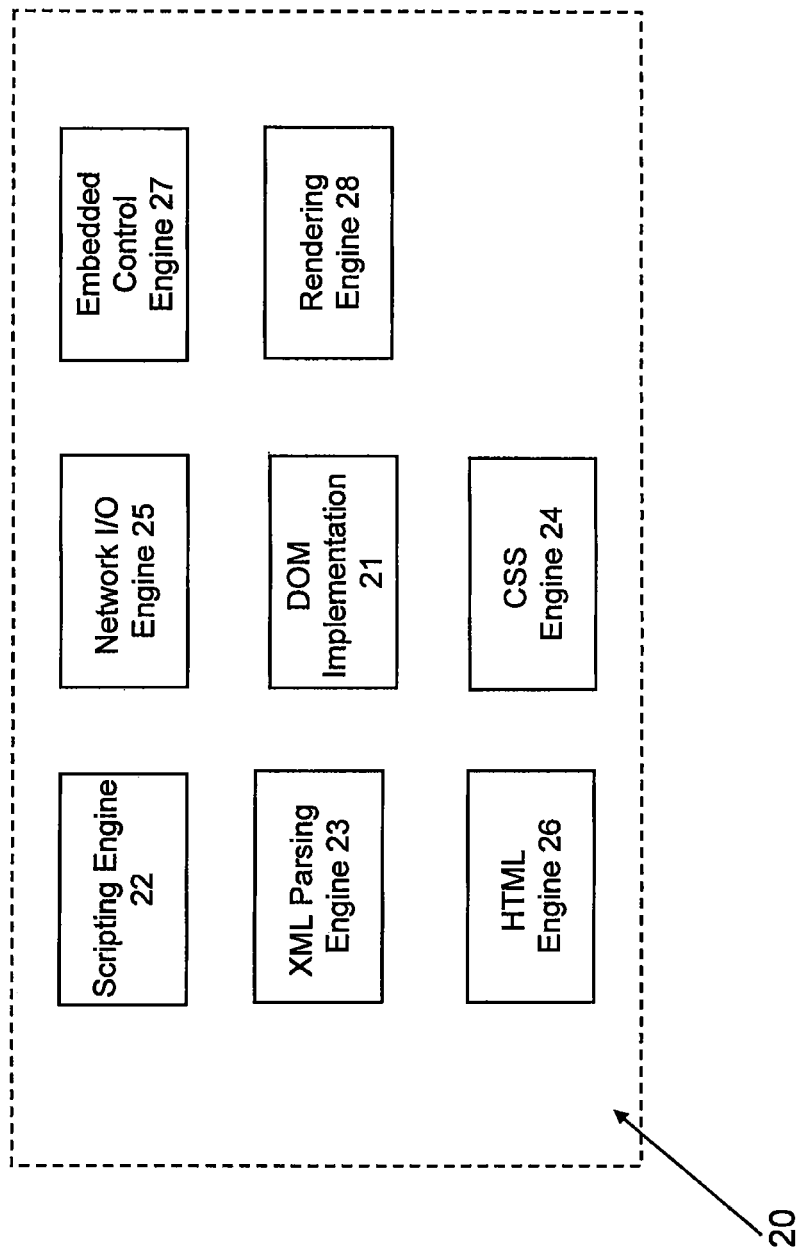
FIG. 3 is a schematic of one embodiment of the Inspector.

In the present embodiment, the Inspector 20 is responsible for downloading all web application components, instantiating the web application, and applying "data-query interfaces" to all objects that exist in the application. In order to do this, the Inspector 20 may host several software components that may be used to perform these tasks as seen in FIG. 3. By way of example and not limitation, these software components can optionally include:

a Document Object Model (DOM) implementation for one or multiple browsers 21 a scripting engine 22 capable of executing JavaScript, JScript, ECMAScript, XAML or VB Script an XML parsing engine 23 a Cascading Style Sheet engine 24 a network I/O library/engine 25 an HTML parsing and rendering engine 26 an engine 27 for executing embedded controls such as ActiveX controls an engine 28 for rendering web applications In the present embodiment, the Inspector 20 downloads and instantiates the web application components as follows. First it downloads the HTML page or frameset for a given target URL. This may be done using standard HTTP GET operations. Based on the content in that parent HTML page or frameset, the Inspector 20 then downloads all of the additional files used to assemble the complete application. These files include scripts, images, style sheets, data files, plug-ins, ActiveX controls, audio or video streams, or any other components required to support the complete application.

Once all the application component files are downloaded, the Inspector 20 then instantiates the application by executing the downloaded files using the appropriate software component, such as the ones listed above.

Once all of the individual application components have been instantiated, and the entire web application has been assembled, the Inspector 20 then applies "data-query interfaces" to all of the instantiated software objects. These "data-query interfaces" may be wrappers which wrap the software objects in the web application with a standard interface that can be used by the Truveo Application Crawler 10 to extract information from the page in an automated fashion. For example, a "data-query interface" may be applied to every individual element of the Document Object Model which allows the Application Crawler 10 to query any attribute or style of that DOM element. Similarly, a "data-query interface" may be applied to every media player instantiated in the web application which allows the Application Crawler 10 to query the media player for media player properties as well as metadata about any downloaded audio or video streams. Optionally, it should be understood that some embodiments of the "data-query interface" may not use a wrapper to wrap a software object. Some embodiments may use a direct connection.

Extractor

Figure 4:
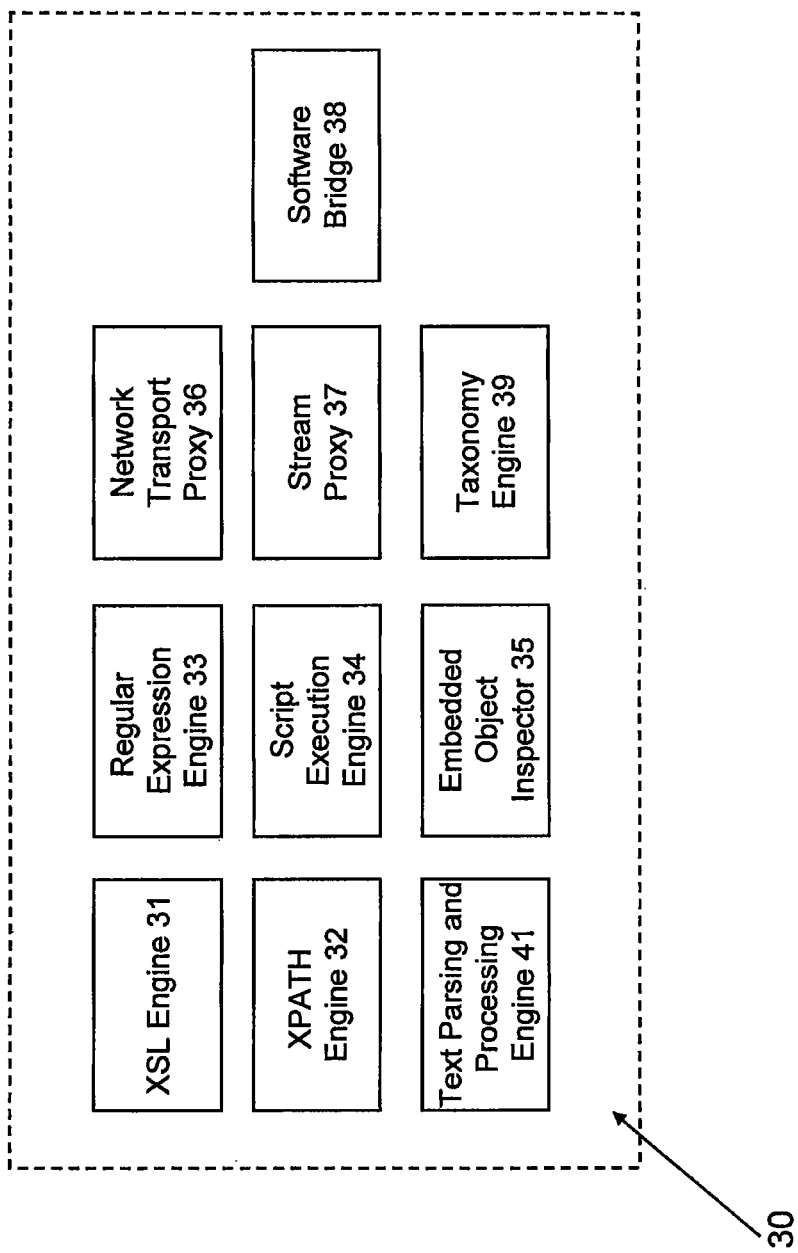
FIG. 4 is a schematic of one embodiment of the Extractor.
Figure 5:
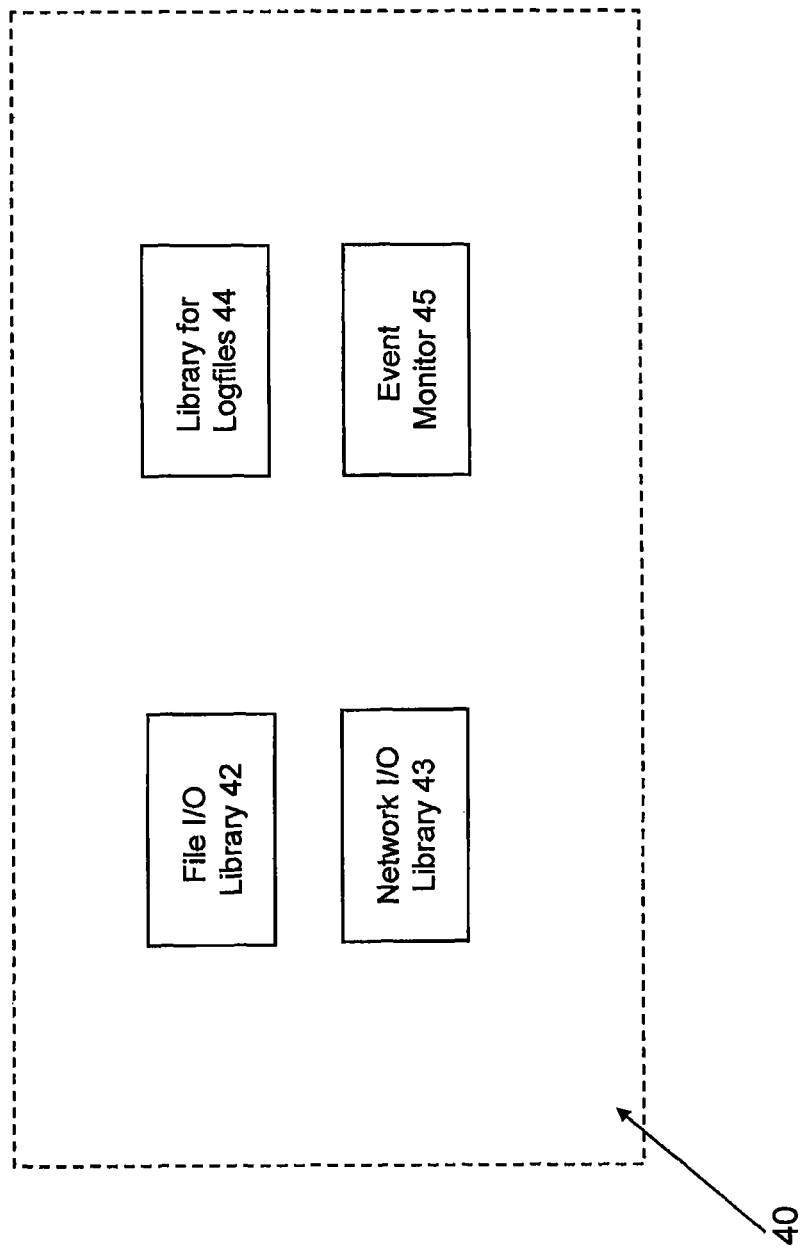
FIG. 5 is a schematic of one embodiment of the Crawler.

The second major component of this embodiment of the Truveo Application Crawler 10 is the Extractor 30. In the present embodiment of this invention, the Extractor 30 is responsible for identifying specific parts of the instantiated web application that contain useful information and providing the logic used to extract that information into a metadata record. In order to do this, the Extractor 30 hosts a variety of software components that it uses to perform these tasks as seen in FIG. 4. By way of example and not limitation these software components can optionally include:

an XSL engine 31 an XPath implementation 32 a regular expression engine 33 a script execution engine 34 an embedded object inspector 35 for components such as, but not limited to, ActiveX and COM objects a network transport proxy 36, such as an HTTP proxy a RTSP or other multimedia stream proxy 37 a software bridge 38 to process data with class libraries of external programming frameworks (e.g. a bridge to .net for additional processing of metadata)

a taxonomy engine 39 for categorizing metadata a text parsing and processing engine 41

In the present embodiment, the Extractor 30 identifies specific parts of the web application that contain useful information by (1) using an automated algorithm to recognize objects in the application that contain useful data, (2) using a predefined template that identifies the objects with useful data, or (3) a combination of (1) and (2). As nonlimiting examples of automated algorithms that the Extractor may use to identify information in the web application, the Extractor may identify information based on changes in the DOM that occur at a specific time, based on spatial proximity to certain objects on the page, based on visual characteristics or visual styles, based on recognizing the presence of certain DOM structures, and/or based on recognizing the presence of certain text or other types of information in a web application. It should be understood that in one embodiment, these automated algorithms use components of Extractor 30 as instructed by the template loaded and in use for the particular web page, application, or the like. As nonlimiting examples of templates that can be used to identify useful data, the Extractor 30 may use methods or attributes of the "data-query interfaces" applied by the Inspector 20, DOM pathnames, XSL or XPath filters, regular expressions, segments of script code, or any combination of the above. These techniques can also be cascaded to further refine the extracted information. The Extractor 30 uses this embedded logic to extract all useful information from the page and return it in a structured metadata record upon request.

Crawler

The third major component of this embodiment of the Truveo Application Crawler 10 is the Crawler 40. In this present embodiment of the invention, the Crawler 40 is responsible for analyzing the instantiated web application, finding and analyzing all clickable items (aka links, onClick events, etc.) in the application, driving the web application by injecting events, and extracting information from the application and writing it to a file or database. In order to do this, the Crawler 40 hosts a variety of software components upon which it relies to perform its tasks. By way of example and not limitation, these components can include:

a file I/O library 42 a network I/O library 43 a library for generating and storing log files 44 a Event Monitor 45

In the present embodiment, the Crawler 40 analyzes the web application and finds all possible items in the page that can respond to mouse click events. These items are called "clickable items". In order to do this, the Crawler 40 identifies page items such as:
(1) HTML tags, such as anchor (i.e. <A> tags, that can respond to mouse click events
(2) HTML elements that contain a valid 'onClick' handler, or children of an object in the DOM that contains a valid 'onClick' handler
(3) HTML elements that are bound to HTML behaviors that handle mouse click events
(4) Elements or objects inside any embedded control, such as a Flash object or a media player, that can respond to mouse events
(5) HTML elements that when clicked cause the web page to perform a form submission.

Once the Crawler 40 has identified all "clickable items" in the application, it stores them in a data structure, such as a tree, also called the "crawl tree."

In the present embodiment, the Crawler 40 is also responsible for driving and monitoring the web application by injecting events and monitoring events. For example, the Crawler 40 injects events into the application such as, but not limited to, mouseover, mousedown, or mouse click events in order to simulate the action of a user clicking on a link. The Crawler 40 can also inject timer events, media player events or browser events, such as a page reload, in order to control the web application as necessary. Thus, as a nonlimiting example, the Crawler 40 may wait till after a simulated mouse, keyboard, or other user event. The Crawler 40 may also wait till after a programmatically generated event, a browser event, and/or a media player event. In addition to driving the application, the Crawler 40 also monitors the application to detect various events. For example, the Crawler 40 can detect events that indicate when new data has been downloaded into the application, or when a new video or audio stream has been launched. These events are all monitored by a global application Event Monitor 45. The Event Monitor is responsible for monitoring the state of a given web application, monitoring events generated by the web application, and controlling the execution of the Crawler 40 based on the appearance or absence of certain states and/or events. As nonlimiting examples, the Event Monitor may monitor (1) specific portions of the document object model or object state of a given web application or embedded control, (2) changes in a portion or all of the screen buffer used to display a web application, and/or (3) events generated by a web page, media player or embedded control.

Under normal operation, the Crawler 40 begins operation when the web application corresponding to the first target URL has been completely instantiated. At this point, the Crawler 40 identifies all "clickable items" on the page and then simulates a mouse click on the first "clickable item" in the list. At this point, the Event Monitor monitors changes in the application in response to the simulated click. Based on the logic coded in the Event Monitor, once certain events have been received (such as page loading or component activation), the Event Monitor triggers the Extractor 30 to return a metadata record containing all desired information from the web application. The Crawler 40 then takes this metadata record and writes it to memory, a file, or inserts it into a database. Once this data has been collected, the Crawler 40 then reexamines the web application and identifies any new clickable items that have appeared since the last simulated mouse click. These new clickable items are appended to the "crawl tree" data structure. The Crawler 40 then proceeds to the next "clickable item" in the "crawl tree", simulates a mouse click on that item, and repeats the steps above. The Crawler 40 continues in this fashion until all clickable items in the web application have been found and clicked. When this is done, the Crawler 40 then proceeds to the next URL in the target URL list. The Crawler 40 may also include a template for crawling the tree. In one embodiment, the template can include both a path to navigate as well as specific timing instructions. It should be understood that the template(s) used in the present invention may govern not just data extraction, but also where to find links, the timing of when to follow a link, the depth to crawl, how to skip a commercial, among other things.

Operation of the Truveo Application Crawler

Figure 6:
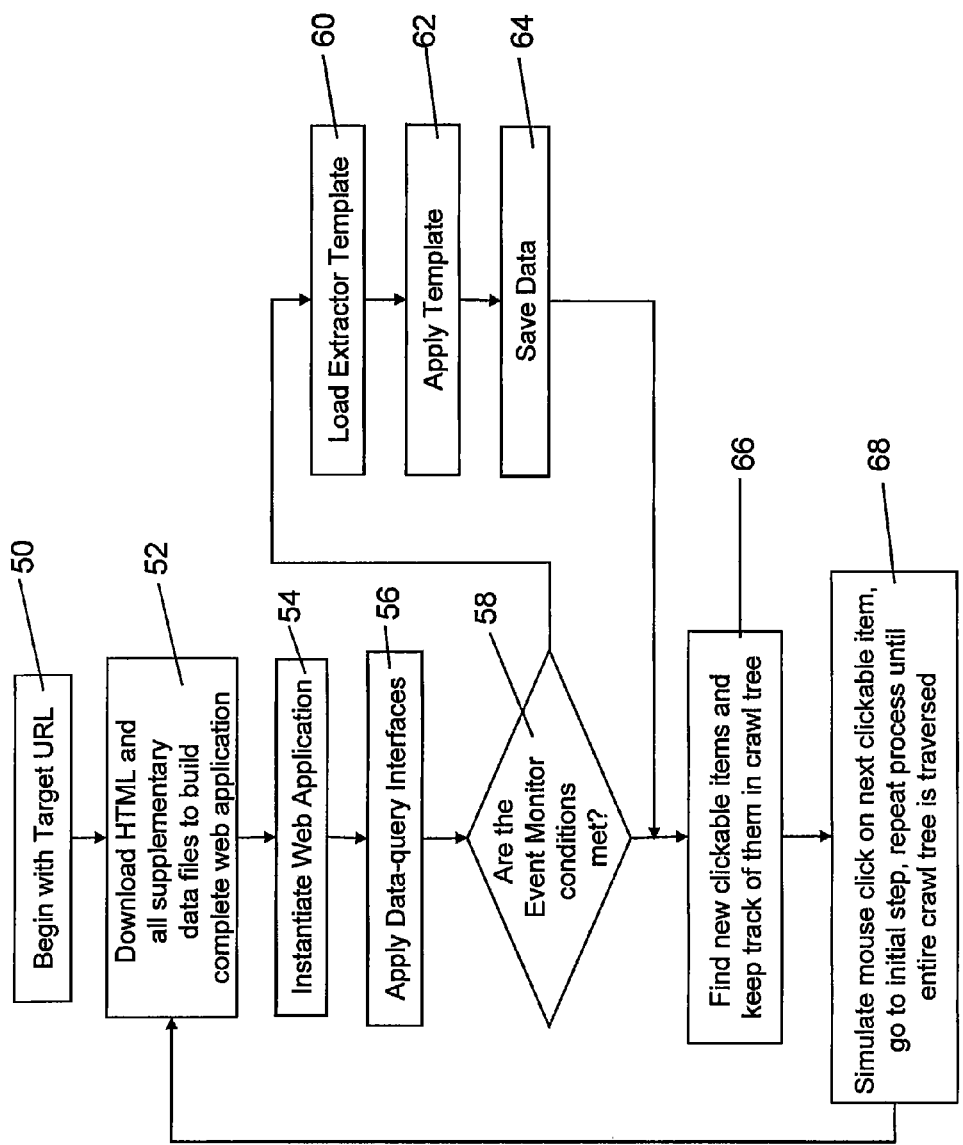
FIG. 6 show one embodiment of a method according to the present invention.

Referring now to FIG. 6, in its standard operating mode, the present embodiment of the Truveo Application Crawler 10 may follow the following steps. Although the following discusses the downloading of an HTML file, the following could also apply to any web application or document such as, but not limited to, XAML, XML, Acrobat, a Flash file or any downloadable web page. The method of the Crawler 10 may include the following:
1. Begin with a target URL (50)
2. Download the HTML file for the given URL (52) (could also be XAML, XML, Acrobat, aFlash file, or any downloadable web page). Based on the information in the HTML file, download all supplememary data files that are used to build the complete web application, such as, but not limited to:
   a. Image files
   b. Script files such as JavaScript, Jscript and VB Script
   c. XML data files and/or XAML files
   d. Style sheet files
   e. ActiveX components or plug-ins
   f. Video streams
   g. Audio streams
   h. Animations such as Flash files
   i. HTML behaviors
3. When all application components have been downloaded, instantiate (54) the complete web application by performing such actions as, but not limited to:
   a. Rendering the HTML and constructing the Document Object Model
   b. Applying the style sheets
   c. Executing any scripts in the appropriate script interpreter
   d. Activating any controls or plug-ins, such as ActiveX controls
   e. Launching video or audio streams
   f. Launching animations such as Flash animations
   g. Executing HTML behavior scripts
4. Once the complete web application has been assembled, instantiated and initialized, apply data-query interfaces (56), as described above, to all objects in the application that may contain useful data.
5. Monitor the state of the application using the Event Monitor (58), and if specified conditions are met, perform the following steps:
   a. Load a pre-defined application template or generate an automatically defined application template (60), as defined above.
   b. Apply the Application template (62) to extract all of the desired information from the web application.
   c. Save the extracted data (64) to a file or database as a structured-data information record.
6. Examine all components in the web application to identify all possible components that could respond to a mouse event, also called clickable items. Determine which clickable items have appeared since the last simulated mouse event.

Store the new clickable items in an appropriate data structure (66), such as in a new branch of a tree containing all clickable items in the application at all possible application states.

7. Simulate a mouse click on the first clickable item in the current branch of the clickable item tree (68), and then go to beginning. Continue repeating these steps until the entire tree of clickable items has been traversed.

It should be understood that for the above method, optionally some steps such as the application of the data-query interface may be skipped. The order of the steps may be changed and some steps may be combined into one step.

Figure 7:
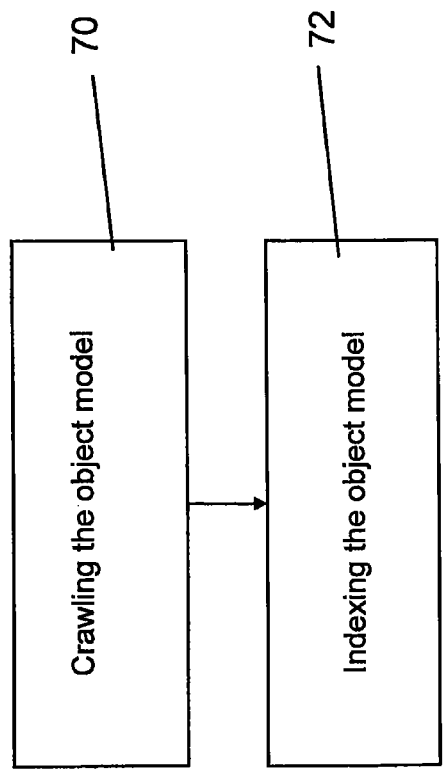
FIG. 7 shows another embodiment of a method according to the present invention.

Referring now to FIG. 7, the essence of the present invention may be viewed as crawling 70 and indexing 72 the object model of multiple running, instantiated documents or applications. Again, this may occur on an Internet scale and crawling may include traversing pages, files, documents, or applications of different machines. These pages, files, documents, or applications are instantiated prior to inspection of clickable items to more thoroughly inspect each for available content and/or metadata.

Data Aggregation

Figure 8:
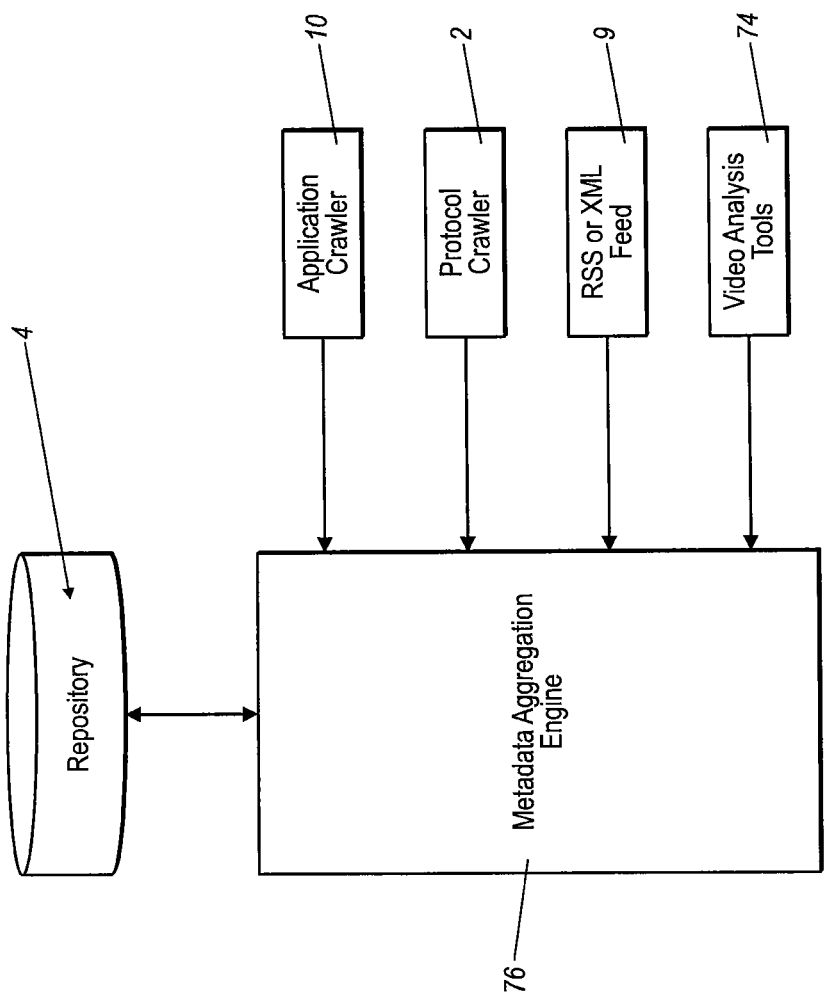
FIG. 8 is a schematic of one embodiment of data aggregation.

Referring to FIG. 8, data gathered by the Application Crawler 10 may be aggregated together. For example, metadata extracted from the Protocol Crawler 2 may be aggregated with metadata extracted by the Application Crawler 10. In addition, data aggregation from multiple sources may occur within the Application Crawler 10 itself. For example, the Application Crawler can inspect multiple web browsers (windows) simultaneously that may be relevant to the video. These web pages may even be in different URI domains. Embodiments of the present invention may also involve aggregating the technical data of a video stream with metadata derived from other sources such as, but not limited to, the Application Crawler 10, the Protocol Crawler 2, RSS/XML feeds 9 or metadata derived from tools 74 used to analyze video (including, but not limited, to voice recognition tools that convert the audio content of a video stream to text). The metadata aggregation engine 76 may save the appropriate pointers, links, text, or other information from the various sources into a searchable reference database.

In yet another embodiment of the present invention, the crawling technology of the present invention includes the ability to associate text-based metadata with technical parameters derived from the video itself. By way of nonlimiting example, technical parameters of a video may include its duration, resolution, frame rate, quality, format, thumbnail, etc. Further, the data gathered from the Application Crawler can be supplemented or aggregated with data from the Protocol crawler, RSS feeds, editorial comments by the operator of the crawler, or data provided by the content's creator or distributor.

Figure 9:
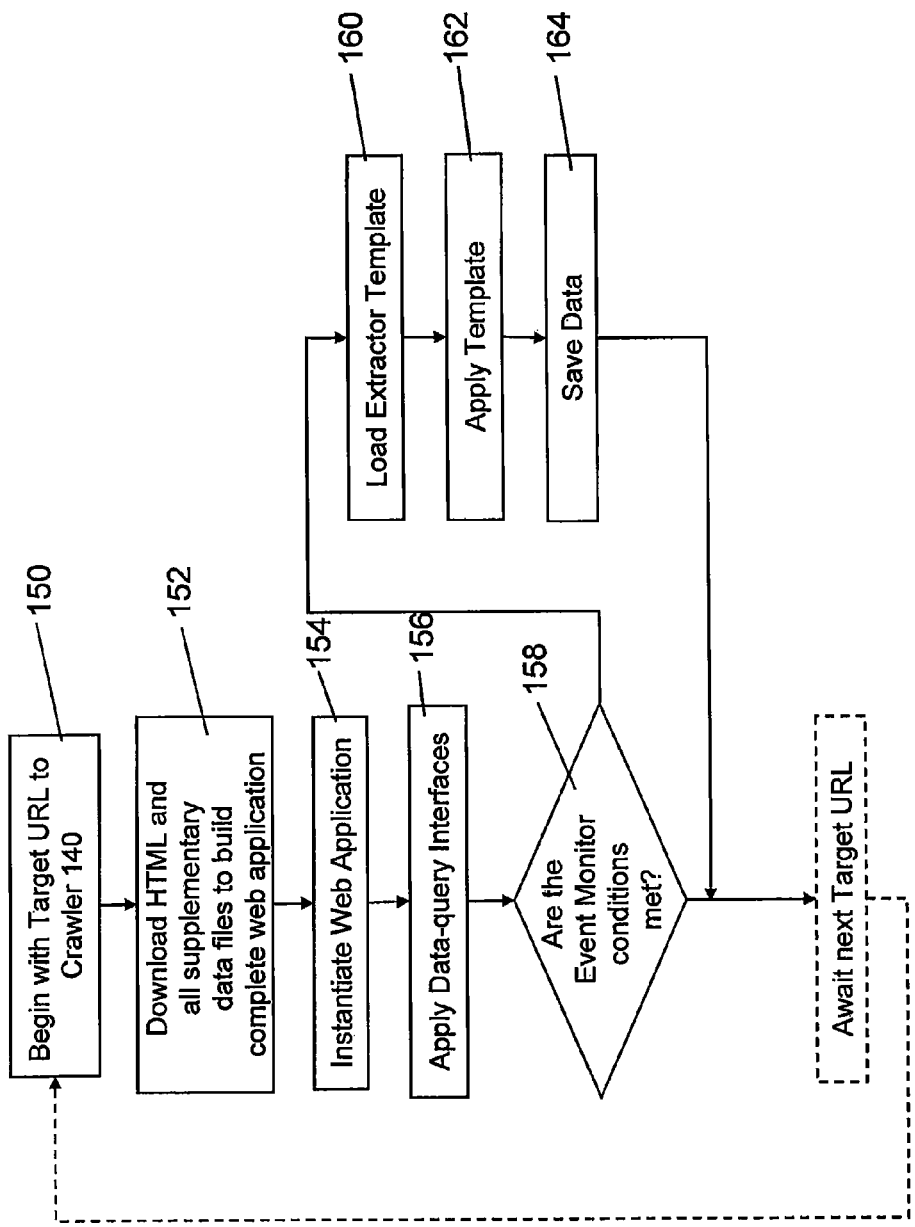
FIG. 9 shows another embodiment of a method according to the present invention.

As seen in FIG. 9, one method of doing this may include a process that uses one embodiment of an Application Crawler 140 of only limited functionality. For example, the present invention may use a URL from an RSS feed as input at step 150, download the HTML and any supplemental material at step 152, render it in a web page (e.g. use a browser to navigate to the URL) at step 154, wait for the web page to display a video, and then query the multimedia player for information about the video using the multimedia player's published application programming interface (API). In this embodiment, the present invention uses published APIs to query the object model of the multimedia player and aggregates the metadata retrieved from the multimedia player with data provided by the source of the input URL. The input URL for this limited Application Crawler could come from a number of places: RSS, Protocol crawler output, XML feeds, hidden data streams used by the web application (e.g. an XML service used by an AJAX application or Simple Object Access Protocol (SOAP) method calls), or other directories of web site that contain video. It should be understood that the present invention may also include the way aggregated textual data and technical details of the video are presented or displayed. As seen in FIG. 9, the method may involve applying a data-query interface at step 156, using an event monitor 158, loading a template at step 160, applying a template at step 162, saving data at step 164, and then returning to step 158. The method may involve waiting for another target URL after the Event Monitor considers the condition met. As non-limiting examples, the condition may include the end of video file, video stream, a predetermined time period, or the like. For the Application Crawler 140, it should be understood that some embodiments of the present invention may use only one template for all sites. Other embodiments may have only a subset or a reduced amount of templates from which to select.

In addition to web pages with video, the present invention also applies to the following:

- A non-browser based video application such as a multimedia player that downloads video and associated metadata.
- A web page with static information (such as text based news) but one that contains dynamic text and video advertisements. In this case the crawler is used to exclude the video and other dynamic content.
- A dynamic web application such as an AJAX application, wiki, user forum, photo sharing site, financial services site, or any web page the content of which changes independently from the web server. For example, imagine a crawler based on the present invention that creates a searchable index of all the images and graphs related to a specific stock symbol.

Another feature of the inspector is the ability to "assert" the structure of a web application that hosts video or other dynamic content. The assertion code uses the template for the web site to determine if the structure of the web site has changed. If the site has changed or the video (or dynamic content) is no longer available, the data is not extracted and the previously extracted data (if any) is removed from the repository if it is no longer available on the web site. This feature is important for maintaining data quality.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, the application crawler may crawl time-sensitive video in real-time. Video content can be highly time-sensitive and is often made available only during limited windows of time. With any of the above embodiments, after the Application Crawler (40) traverses the objects, there may be post processing that includes data aggregation (as mentioned above) or voice-to-text recognition prior to putting the data in the repository.

With any of the above embodiments, the application crawler may index content using numerous fields of metadata. In one embodiment, the present application can reach into a video stream or video player and pull out relevant data. In another embodiment, the present invention can look at events that are fired by or in conjunction with the video stream and obtain information in that manner. It should be understood that, in some embodiments, Truveo Application Crawler will do whatever is required to render the web application in the same manner that a browser would. Thus the state of the instantiated web page, application, or the like is the same as that which would be created by a browser. This allows the Application Crawler to find content in the object model that would be available only if the document or file were instantiated. With any of the above embodiments, it should be understood that the Application Crawler may also be configured to handle video streams and is not limited to only video files. It should be understood that the term "files" as in "video files" may include the delivery of the content of the file in the form of a stream from a server (i.e. a media server).

It should be understood that the Application Crawler assembles and dynamically instantiates components of a web page, where the instantiated web application may then be analyzed to locate desired components on the web page. This may involve finding and analyzing all clickable items in the application, driving the web application by injecting events, and extracting information from the application and writing it to a file or database. The components for assembling and instantiating the web application may be as described in the present application. In other embodiments, variations may be made to the present embodiment such as, but not limited to, combining functionalities between various components, adding software components for handling additional applications, executing some steps simultaneously, or the like. It should be understood that the present invention also encompasses search engines and methods that search databases created by crawlers according to the present invention.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. U.S. Provisional Application 60/630,552, filed Nov. 22, 2004, and U.S. Provisional Application 60/630,423, filed on Nov. 22, 2004 are both fully incorporated herein by reference for all purposes. All publications mentioned herein are incorporated herein by reference to disclose and describe the structures and/or methods in connection with which the publications are cited.

Expected variations or differences in the results are contemplated in accordance with the objects and practices of the present invention. It is intended, therefore, that the invention be defined by the scope of the claims which follow and that such claims be interpreted as broadly as is reasonable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    loading a web page;
    identifying an extractor template for extracting information from the web page, wherein the extractor template comprises timing instructions for extracting information from the web page;
    identifying a first object loaded in a web page;
    simulating user input that manipulates the identified first object;
    identifying, by at least one processor, a video loaded in response to the simulated user input;
    extracting first information from the video;
    in accordance with the timing instructions of the extractor template, skipping a commercial associated with the video;
    continuing, in accordance with the timing instructions of the extractor template, to extract information from the video by extracting second information from the video after skipping the commercial associated with the video; and
    aggregating the first information from the video and the second information from the video in an index.

2. The method of claim 1, further comprising indexing an object model of the web page.

3. The method of claim 2, further comprising:
    traversing a tree of the object model to identify a second object that is user manipulable and loaded in the web page;
    applying a data query interface to the second object;
    simulating user input that manipulates the second object and causes the second object to change state; and
    extracting information from the second object.

4. The method of claim 3, wherein the identified first object is a media player.

5. The method of claim 1, further comprising post-processing the information extracted from the identified video.

6. The method of claim 5, further comprising applying voice-to-text recognition to at least a portion of the information extracted from the video.

7. The method of claim 1, further comprising reexamining the web page in accordance with at least one of an automated algorithm or the extractor template.

8. The method of claim 1, further comprising identifying a second object loaded in the web page based on a spatial proximity of the second object with respect to one or more other objects on the web page.

9. The method of claim 1, further comprising identifying a second object loaded in the web page based on one or more visual characteristics of the second object.

10. The method of claim 1, further comprising identifying a second object loaded in the web page based on a time the second object is loaded in the web page.

11. The method of claim 1, further comprising:
    extracting the first information using a first extraction technique comprising one of a Document Object Model implementation for a browser, a scripting engine, an XML parsing engine, a Cascading Style Sheet engine, a network I/O library, an HTML parsing and rendering engine, an engine for executing embedded controls, or an engine for rendering web applications; and
    extracting the second information using a second extraction technique comprising one of an XSL engine, an XPATH implementation, a regular expression engine, a script execution engine, an embedded object inspector, a network transport proxy, a multimedia stream proxy, a software bridge, a taxonomy engine for categorizing metadata, or a text parsing and processing engine.

12. The method of claim 1, further comprising cascading a first extraction technique and a second extraction technique to further refine the information extracted from the video.

13. A non-transitory computer-readable medium including a set of instructions that, when executed, cause at least one processor to perform the steps comprising:
    loading a web page;
    identifying an extractor template for extracting information from the web page, wherein the extractor template comprises timing instructions for extracting information from the web page;

identifying a first object loaded in a web page;
simulating user input that manipulates the identified first object;
identifying a video loaded in response to the simulated user input;
extracting first information from the video;
in accordance with the timing instructions of the extractor template, skipping a commercial associated with the video;
continuing, in accordance with the timing instructions of the extractor template, to extract information from the video by extracting second information from the video after skipping the commercial associated with the video; and
aggregating the first information about the video and the second information about the video in an index.

14. The non-transitory computer-readable medium of claim 13, further comprising instructions that, when executed, cause at least one processor to perform the step of identifying, in accordance with an automated algorithm, a second object loaded in the web page.

15. The non-transitory computer-readable medium of claim 14, further comprising instructions that, when executed, cause at least one processor to perform the steps of:
loading the extractor template; and
identifying the second object based at least in part on the extractor template.

16. The non-transitory computer-readable medium of claim 15, further comprising instructions that, when executed, cause at least one processor to perform the step of identifying the second object based on a spatial proximity specified by the extractor template.

17. The non-transitory computer-readable medium of claim 15, further comprising instructions that, when executed, cause at least one processor to perform the step of identifying the second object based on one or more visual characteristics specified by the extractor template.

18. The non-transitory computer-readable medium of claim 15, further comprising instructions that, when executed, cause at least one processor to perform the step of identifying the second object based on a time specified by the extractor template.

19. A method comprising:
monitoring execution of a web page;
identifying an extractor template for extracting information from the web page, wherein the extractor template comprises timing instructions for extracting information from the web page;
applying, by at least one processor, the extractor template to the web page to identify a first object loaded in the web page;
simulating user input that manipulates the identified first object;
identifying, by the at least one processor, a video loaded in response to the simulated user input;
extracting first information from the video;
in accordance with the timing instructions of the extractor template, skipping a commercial associated with the video;
continuing, in accordance with the timing instructions of the extractor template, to extract information from the video after skipping the commercial by extracting second information from the video; and
aggregating the first information from the video and the second information from the video in an index.

20. The method of claim 19, further comprising detecting an advertisement provided in connection with the video.

21. The method of claim 19, further comprising monitoring changes in at least a portion of a screen buffer used to display the web page.

22. The method of claim 21, further comprising detecting events triggered by a media player embedded in the web page.

23. The method of claim 22, wherein the web page comprises one or more web applications.

* * * * *